Figure 1:
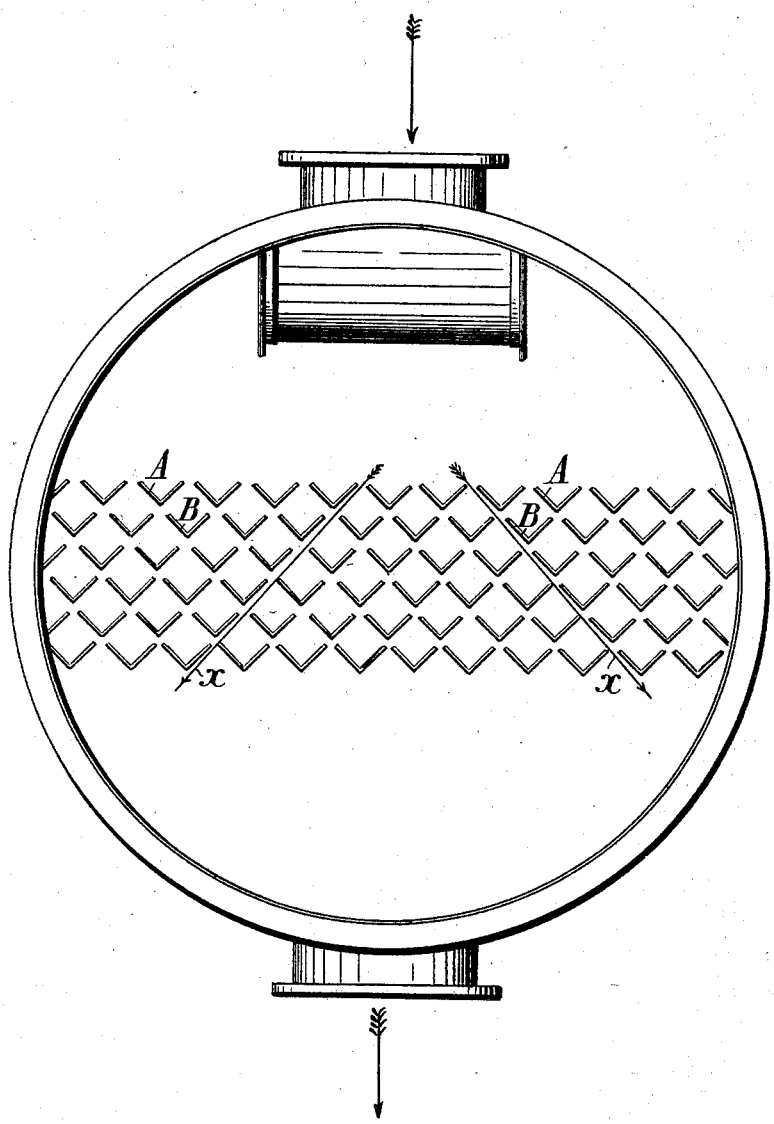

No. 722,272. PATENTED MAR. 10, 1903.
W. J. BAKER.
STEAM SEPARATOR.
APPLICATION FILED FEB. 28, 1902.
NO MODEL. 5 SHEETS—SHEET 1.

No. 722,272. PATENTED MAR. 10, 1903.
W. J. BAKER.
STEAM SEPARATOR.
APPLICATION FILED FEB. 28, 1902.
NO MODEL. 5 SHEETS—SHEET 2.
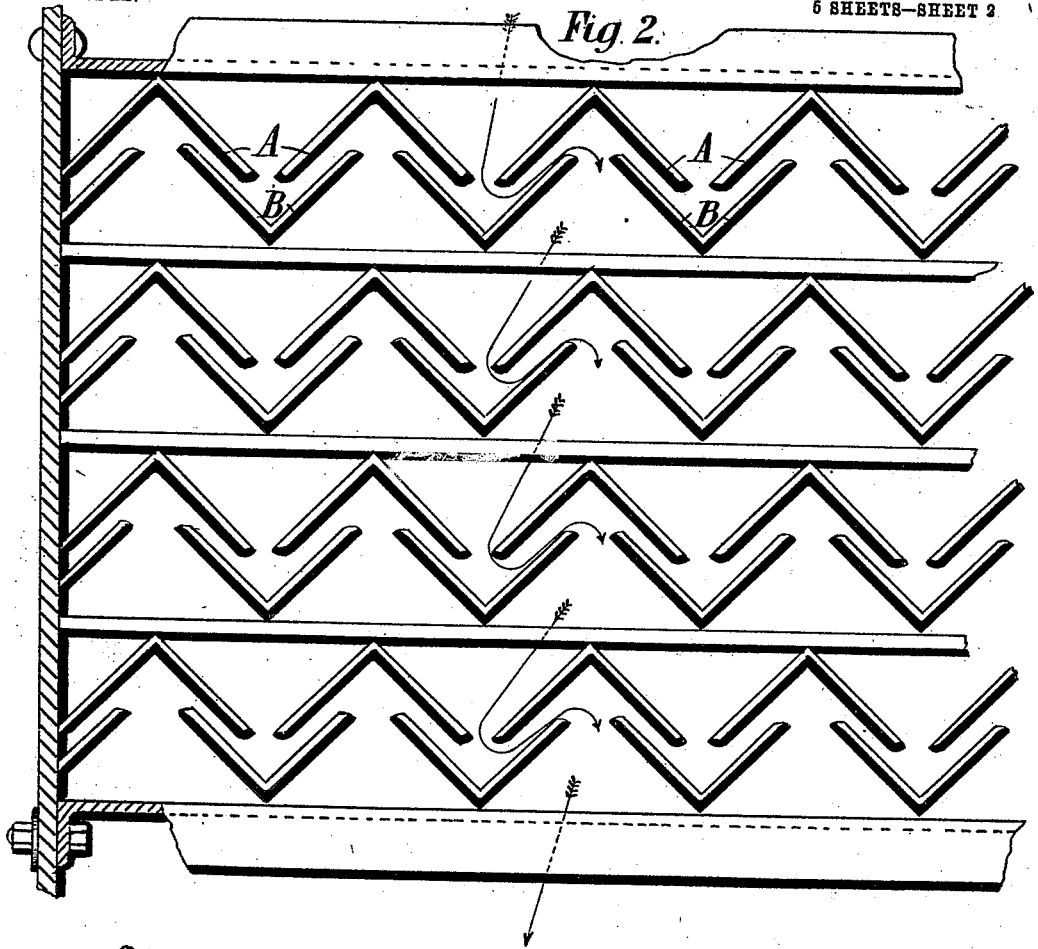
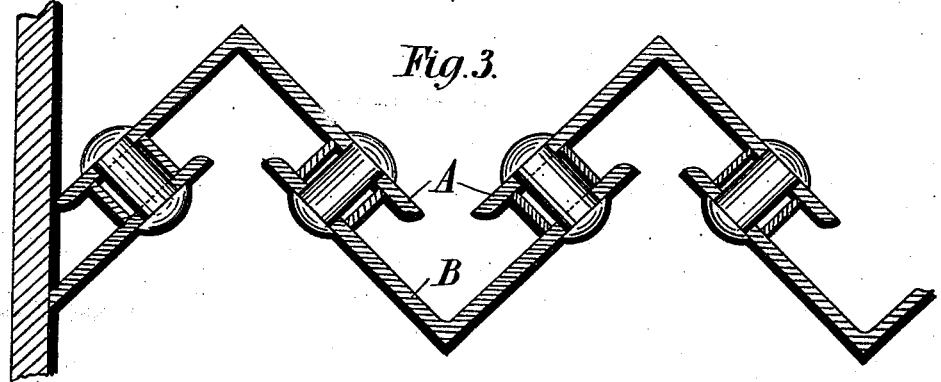

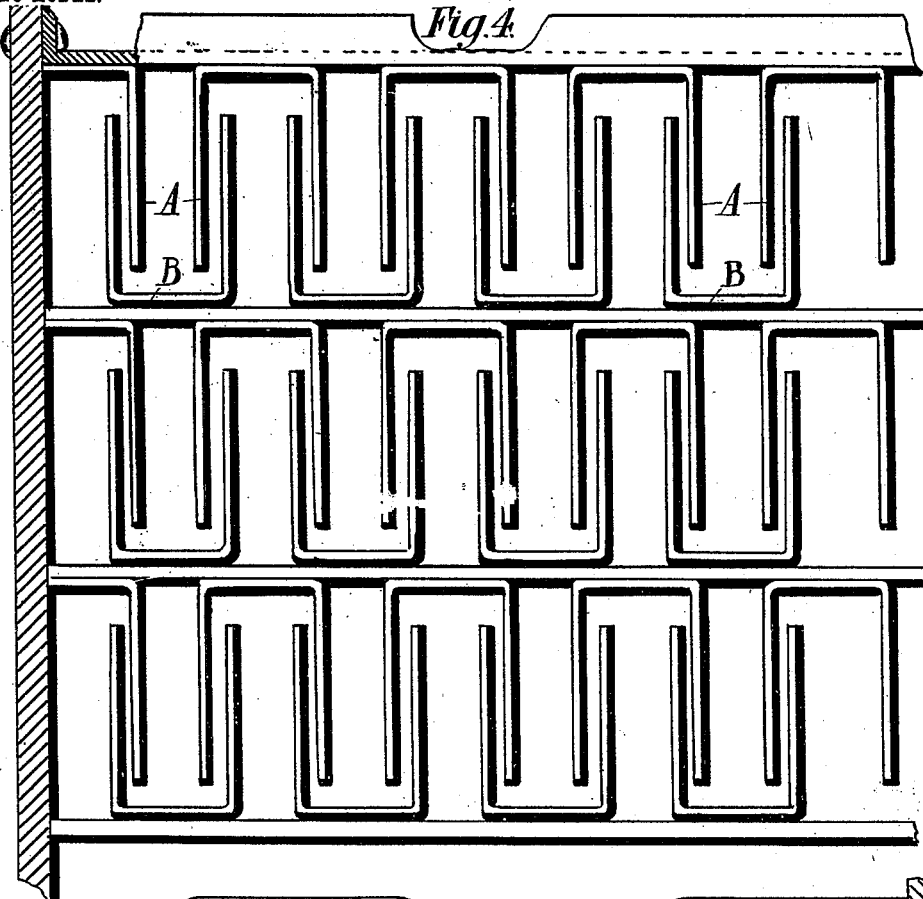
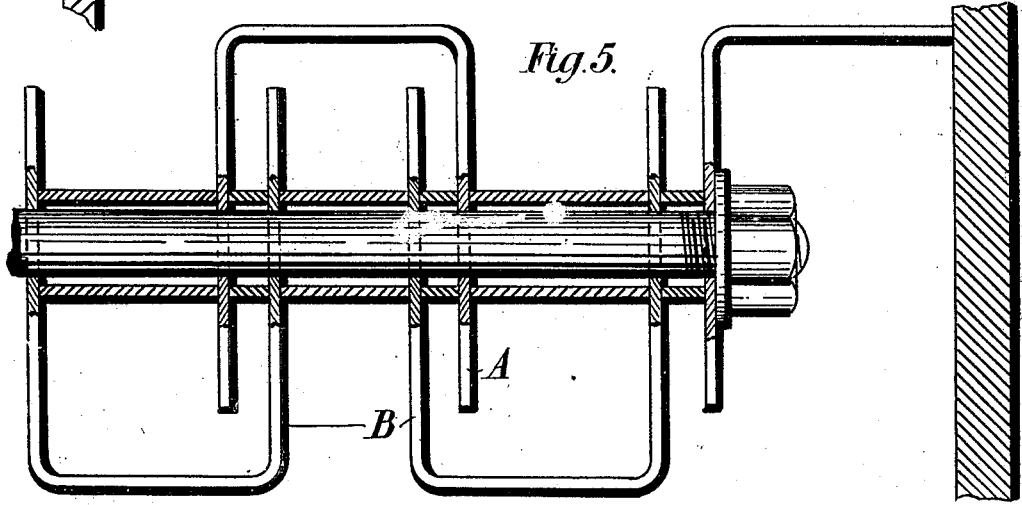

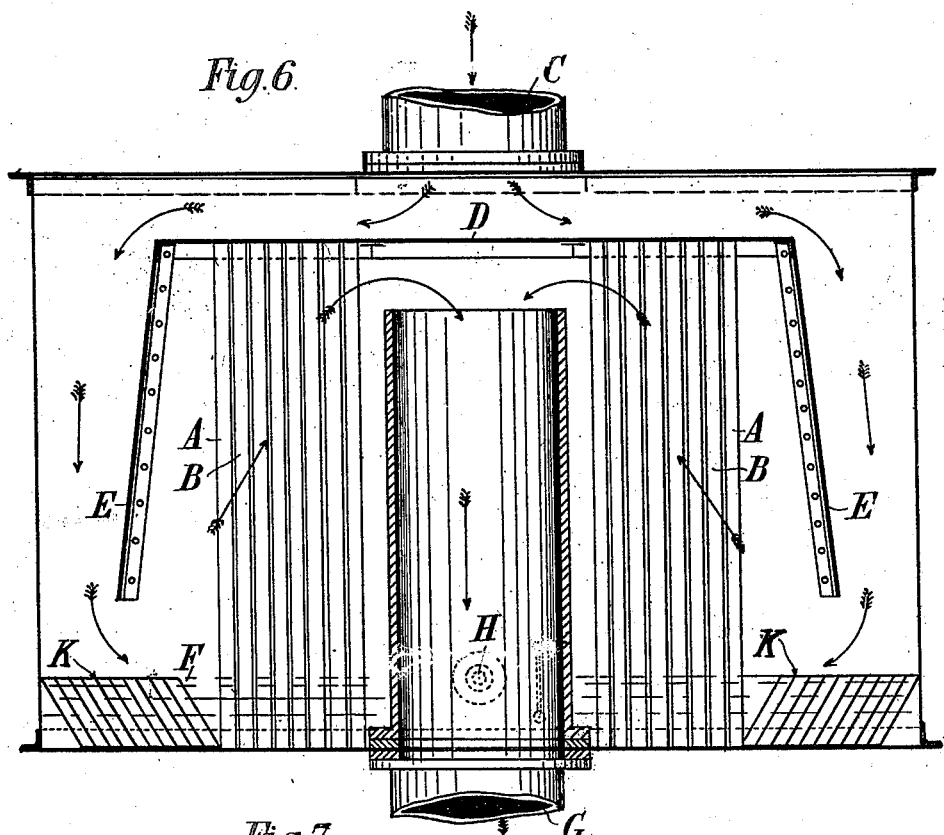
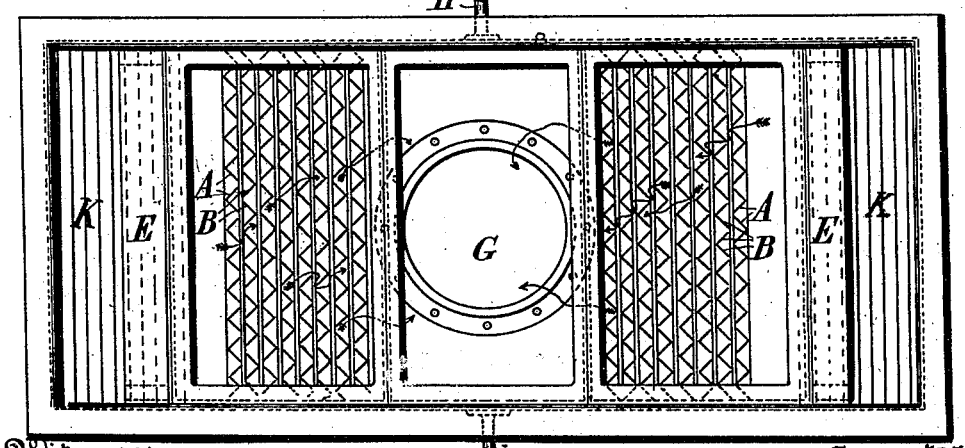

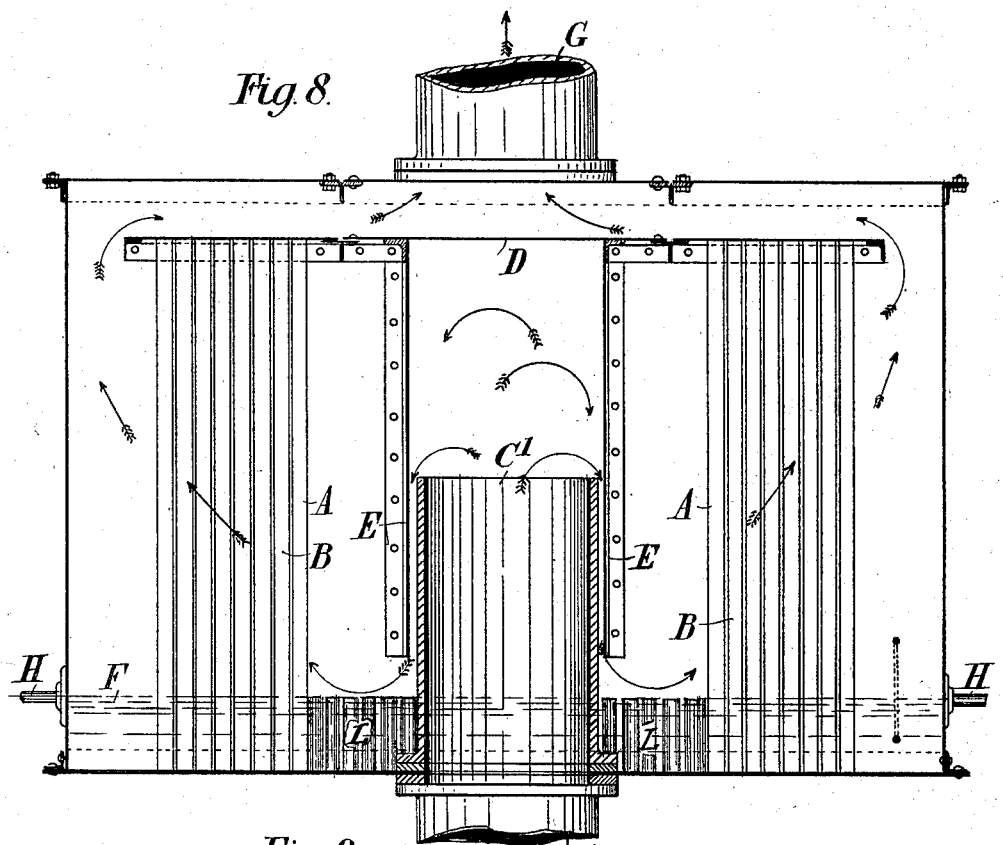
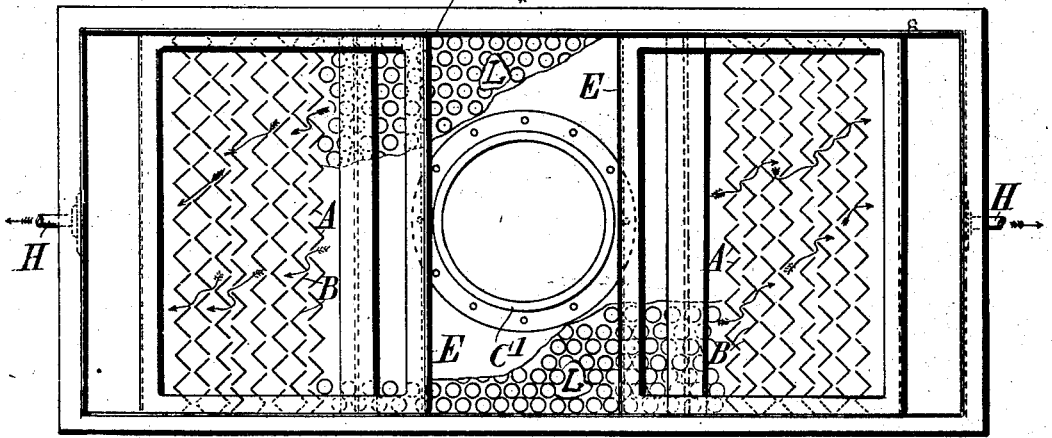

UNITED STATES PATENT OFFICE.

WILLIAM JAMES BAKER, OF SCARBOROUGH, ENGLAND.

STEAM-SEPARATOR.

SPECIFICATION forming part of Letters Patent No. 722,272, dated March 10, 1903.

Application filed February 28, 1902. Serial No. 96,155. (No model.)

*To all whom it may concern:*

Be it known that I, WILLIAM JAMES BAKER, a subject of the King of Great Britain, residing at Peasholme House, Scarborough, in the county of York, England, have invented new and useful Improvements in Steam-Separators, of which the following is a specification.

This invention consists principally in improvements upon my former British patents, No. 5,516, dated March 15, 1895, and No. 15,384, dated June 28, 1897, and has for its object to effect the more complete separation of oil or water from exhaust or other steam.

In carrying out my former inventions I employ a deflector and several rows of angle-irons placed vertically to intercept the steam charged with grease or water, the said angle-irons acting as bafflers to collect the grease or water impinging upon them and also as channels for conducting the separated or collected grease downward to the well or lower part of the separator. In my present improvements I employ deflectors for diverting the course of the steam, and as angle-irons are a cheap article of commerce, easily procured, and exactly answering my purpose I continue to employ angle-iron bafflers; but they are now arranged in such manner as to be more effective in the collection and separation of grease than as they were arranged according to my former patents. As an alternative to the employment of angle-iron bafflers channel-irons of U-section may be used.

In order to enable this invention to be fully understood, I will proceed to describe the same with reference to the accompanying drawings, in which—

Figure 1 represents in a sectional plan the arrangement of the angle-iron bafflers according to my former patents referred to. Fig. 2 represents a sectional plan, and Fig. 3 a sectional plan, upon a larger scale, of the improved arrangement of angle-iron bafflers. Fig. 4 represents a sectional plan, and Fig. 5 a sectional plan, upon a larger scale, of the improved arrangement of channel-iron or U-section bafflers. Fig. 6 represents a sectional elevation, and Fig. 7 a sectional plan, of a rectangular separator constructed according to my improvements, the steam entering at the top of the apparatus and passing out at the bottom. Figs. 8 and 9 are corresponding views of a separator in which the steam enters at the bottom and leaves at the top.

Similar letters refer to similar parts in all the drawings.

Arrows indicate the direction of the currents of steam.

In Fig. 1 the angle-iron bafflers A A (shown in section) are so arranged that the center of each angle in the second row B B is opposite to the space between two angles in the front row A A, or what is known as the "hit-and-miss" arrangement; but it is quite possible for a certain portion of the steam to pass through several rows without such actual contact with sufficient surface of the angle-irons as to collect and separate as much of the oil or water as may be desirable. For instance, a large volume of steam might pass in the direction of the arrows x x with very little contact or separation taking place. Now the principal object of this invention is by means of an improved arrangement of the angle-iron bafflers relatively to one another (as illustrated in Figs. 2 and 3, wherein the angle-irons are fixed in double rows, the front row A A having its angle turned to the steam-inlet and the second row with its hollow to the front row, so that the angle-irons of the front row bridge over the space between each two angle-irons in the second row) to prevent the steam from "short-circuiting" or passing through without being forced in its passage to come into contact with both sides of the angle-iron bafflers.

By means of the above arrangement the steam is first driven into the angle of the second row of angle-iron bafflers B B and is then reversed in its course, turning back into the angle of the front row A A, so that each double row compels the steam to pass into the angles of each row, besides reversing the direction and causing contact with both surfaces of the bafflers.

The modification shown in Figs. 4 and 5 acts in a similar manner to the arrangement represented at Figs. 2 and 3, U-sectioned bafflers being substituted for angle-irons.

Figs. 6 and 7 represent a rectangular separator in which the steam enters at the inlet branch C and, passing between the top of the separator and the deck or partition D D, is led downward at both ends of the separator by deflectors or bafflers E E until it comes in contact with the greasy water F F, as in my former invention, and then passes between the angle-iron or other bafflers, which may be arranged as above referred to with reference to Figs. 1, 2, or 4, respectively. The overflow for separated grease and water at H H may be connected with a suitable pump when the separator is required to work with a condenser under a vacuum. The purified steam passes out at the branch G, which may be connected direct to a condenser or conducted away by pipes.

In Figs. 8 and 9 a separator is represented which is similar in most respects and in action to that already described, except that the steam passes in the reverse direction, entering at C and passing up the internal pipe C' until it comes in contact with the partition-plate D D, and then downward below the edges of the deflectors E E, coming in contact with the greasy water, and then passing between angle-iron or other bafflers arranged as previously described, and finally passing upward and over the plate D D to the outlet G.

In order to prevent splashing of the greasy water from the bottom of the separator by an inrush of steam, which water might be thrown up in the form of spray upon the angle-iron bafflers and carried forward by the current of steam, inclined plates (represented at K K, Figs. 6 and 7) are fixed at distances of, say, about one inch apart across the space occupied by the greasy water at the bottom of the separator, or the water-space may be closely packed with short lengths of tube fixed vertically, as represented at L L in Figs. 8 and 9. Either of these devices will prevent the water from being splashed or driven up in the form of spray upon the angle-iron bafflers.

For a steam-drier for separating water from steam, as the steam is generally live steam at a high pressure, which requires to be purified, the shell of this apparatus is preferably made in a cylindrical form; but the angle-iron or other bafflers are arranged in the manner described and represented.

The double rows of angle-iron or other bafflers described are held in position by angle-irons or stays fixed to the shell of the separator, and as many of these double rows may be placed in each shell as are required to fully purify the steam without causing an undue amount of resistance or "back pressure."

Having now particularly described and ascertained the nature of my said invention and in what manner the same is to be performed, I declare that what I claim is—

1. In a steam-separator, the combination with a casing having a steam inlet and outlet, of a series of baffle-plates located between said inlet and outlet, said plates having each a longitudinally-extending concave side and an opposite longitudinally-extending convex side, said plates being arranged in rows, the concave sides of the plates of one row being toward the concave sides of the plates of another row, and the adjacent edges of the plates of one of said rows being opposite the concave faces of the plates of the other rows, substantially as described.

2. In a steam-separator, the combination with a casing having a steam inlet and outlet, of a series of baffle-plates located between said inlet and outlet, said plates having each a concave side and an opposite convex side, said plates being arranged in rows, the concave sides of the plates of one row being toward the concave sides of the plates of another row, and the adjacent edges of the plates of one of said rows extending into the concave portions of the plates of the other row, substantially as described.

3. In a steam-separator, the combination with a casing having a steam-inlet and a steam-outlet, a series of baffle-plates located in said casing between said inlet and outlet, a deflector for directing the steam down toward the bottom of the casing, and a plurality of stationary devices located in the lower part of the casing to prevent the water contained therein from splashing, substantially as described.

4. In a steam-separator, the combination with a casing having a steam-inlet and a steam-outlet, a series of baffle-plates located in said casing between said inlet and outlet, a deflector for directing the steam down toward the bottom of the casing and a series of plates located in the lower part of the casing adjacent to the incoming steam, to prevent the water in the bottom of the casing from splashing, substantially as described.

WILLIAM JAMES BAKER.

Witnesses:
 GEORGE B. BLACK,
 GEORGE H. WHITTAKER.